Nov. 6, 1956  E. SOEHNGEN  2,769,334
SIMULATOR FOR TRANSIENT CONVECTIVE HEAT TRANSFER PHENOMENA
Filed Nov. 15, 1954  4 Sheets-Sheet 1
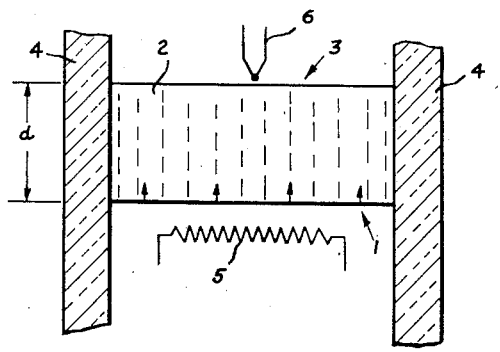
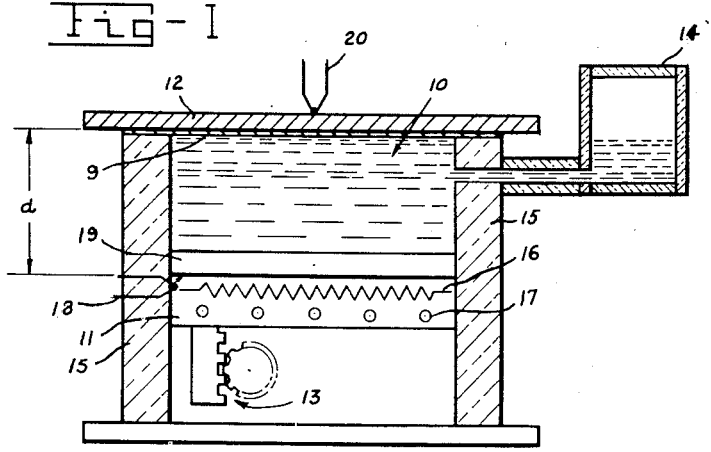
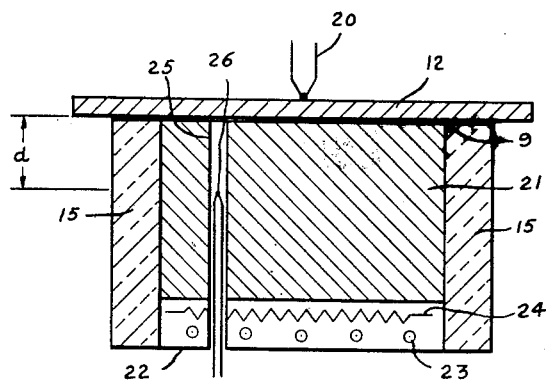
INVENTOR.
ERICH SOEHNGEN
BY Donald C. Kearney
Wade Koontz
ATTORNEYS Nov. 6, 1956 E. SOEHNGEN 2,769,334
SIMULATOR FOR TRANSIENT CONVECTIVE HEAT TRANSFER PHENOMENA
Filed Nov. 15, 1954 4 Sheets-Sheet 2

INVENTOR.
ERICH SOEHNGEN
BY Donald C. Keaveney
and
Wade Koontz
ATTORNEYS

Nov. 6, 1956 E. SOEHNGEN 2,769,334
SIMULATOR FOR TRANSIENT CONVECTIVE HEAT TRANSFER PHENOMENA
Filed Nov. 15, 1954 4 Sheets-Sheet 4
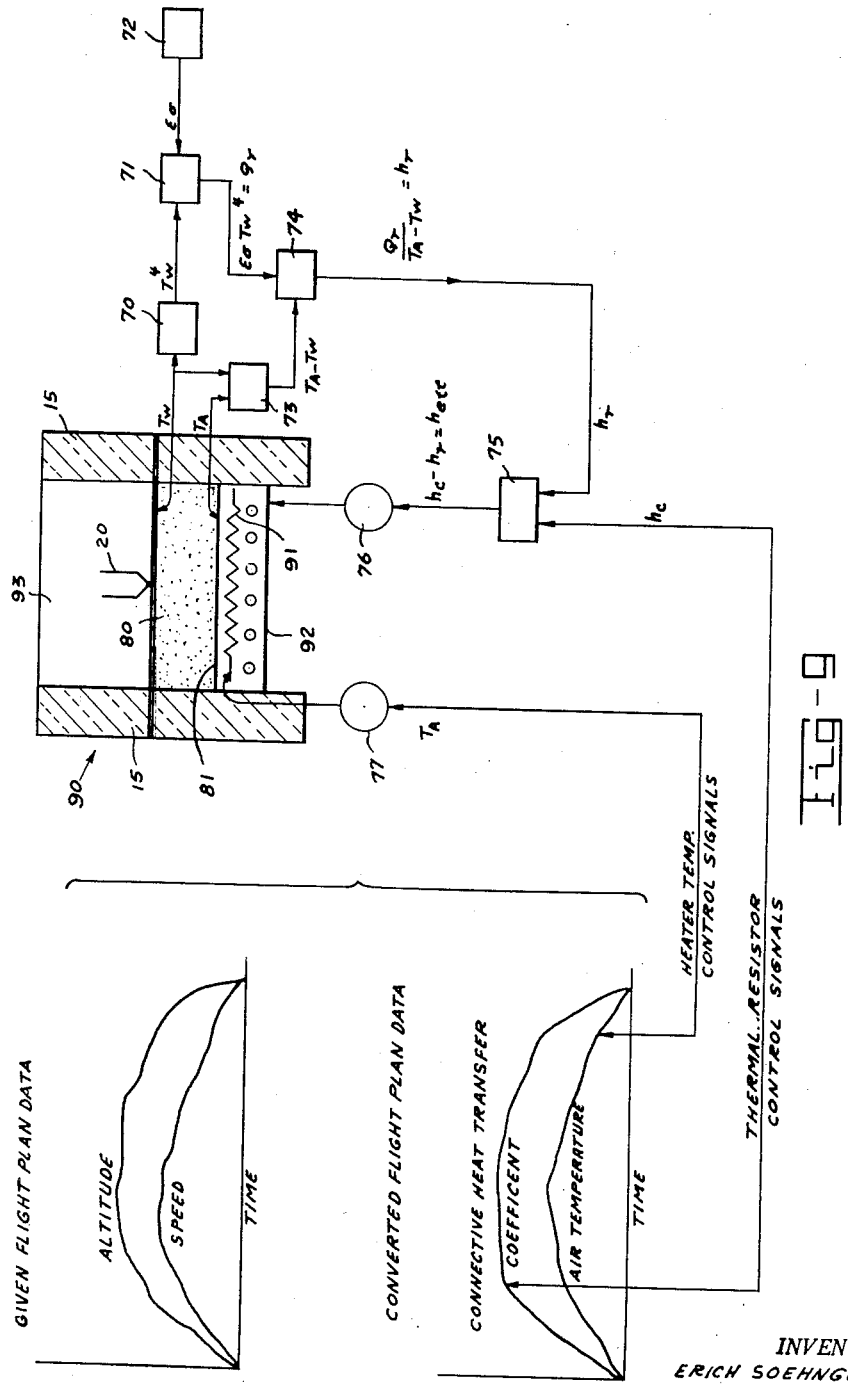
INVENTOR.
ERICH SOEHNGEN
BY Donald C Keaveney
Wade Koontz
ATTORNEYS United States Patent Office 2,769,334
Patented Nov. 6, 1956

2,769,334

SIMULATOR FOR TRANSIENT CONVECTIVE HEAT TRANSFER PHENOMENA

Erich Soehngen, Dayton, Ohio, assignor to the United States of America as represented by the Secretary of the Air Force Application November 15, 1954, Serial No. 469,066

10 Claims. (Cl. 73—15)

(Granted under Title 35, U. S. Code (1952), sec. 266)

The invention described herein may be manufactured and used by or for the United States Government for governmental purposes without payment to me of any royalty thereon.

This invention relates to a new experimental apparatus by which transient convective heat transfer phenomena such as occur, for example, on the skin of aircraft or missiles under actual flight conditions may be truly simulated by a simple laboratory technique. The simulation of "inflight heat transfer" in the laboratory facilitates the measurement of effects of aerodynamic heating or high altitude cooling on the structures and components of aircraft and missiles under test. Important problems to be solved are, for example, the determination of fuel losses in integral wing tanks due to aerodynamic heating and the determination of temperature distribution within aircraft structures and the corresponding effects upon structural strength.

The present state of the art allows a reasonably accurate analytical prediction of the quantity of heat exchanged between the surface or wall of a flying craft and the surrounding air if steady state conditions may be assumed. Thus, in the basic heat transfer equation $Q=h(T_A-T_W)$, $h$, the coefficient of heat transfer is a function of velocity and altitude and can be predetermined for any given steady state; $T_A$, air temperature and $T_W$ the temperature of the wall can likewise be determined for any given steady state and hence $Q$, the quantity of heat transferred can be calculated. When either speed or altitude or both are varying, transient conditions arise. Although $h$ and $T_A$ are still known functions of time, they are not constant and $T_W$ is no longer a known quantity since it does not reach an equilibrium value under transient conditions. Almost all missions in modern aerial warfare can be assumed to take place under transient flight conditions. Variations of speed and altitude as required by various flight missions are transient conditions with corresponding effects on the rate of heat exchange. The analytical determination of these effects, with time varying heating effects becomes a very tedious task which may not yield realistic results due to the simplifying assumptions which must be made in order to render the problem mathematically tractable.

Experimental solution of these problems by other than expensive direct flight tests require that the time dependent heat transfer conditions such as occur during any given flight mission be simulated as realistically as possible. Previously no simple experimental method has been made known by which transient heat transfer conditions can be truly simulated. Approximate methods have been devised such as blowing heated air along the surfaces of the test models, heating of the test surfaces by radiation or by high frequency induction heaters, etc., but none of the various methods simulate the actual heat transfer conditions. Only arbitrary transient heating has been achieved.

It is an object of this invention to simulate the true transient heat transfer conditions of free flight in the laboratory using full size airplane structures and components or scale models of such as test specimens to be subjected to the varying conditions of any possible flight mission.

It is a further object of this invention to provide a simulator apparatus with provision for representing variations of both temperature and heat transfer coefficient.

These and other objects are achieved by the use of an insulated box containing an adjustable source of heat or cold and a material having a known and variable thermal conductivity which material represents the thermal resistance which gives rise to the heat transfer coefficient to be simulated. One surface of this box is a diathermic wall rather than an insulator and this diathermic wall may be applied directly in heat exchange with the surface of the component or model to be tested. Hence by this new method the test specimen will be subjected to heating or cooling in rate and time variation identical to that experienced on a given flight mission. The corresponding effects on structures or components may then be measured directly by conventional means. The invention will be more fully described in the following specification and drawings forming a part thereof in which:

Fig. 1 is a schematic drawing illustrating the basic principles of the invention.

Figs. 2 through 6 are cross-sectional views of five different embodiments of simulator units.

Fig. 9 is a diagrammatic view showing how any one of the simulators may be used in conjunction with an electrical analogue computer to obtain more accurate results.

Figure 4:
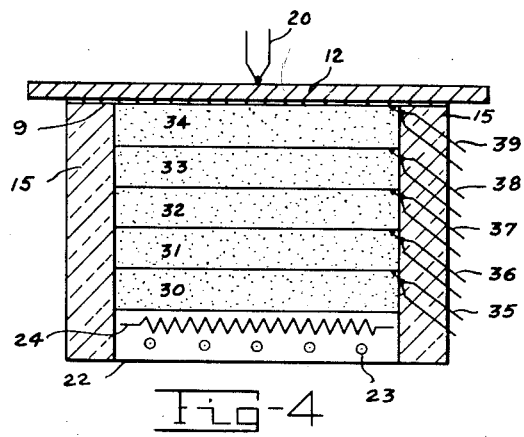

It can be shown that only a few heat transfer parameters have to be simulated in order to achieve adequate simulation of heat input conditions as they exist in free flight. These parameters are: (1) the highest temperature of the air surrounding the aircraft, the so-called recovery temperature; (2) the heat transfer coefficient on the surface of the craft determining how much heat will be exchanged between air and surface under given temperature conditions; and (3) thermal and geometric similarity of the test specimen and the actual structure.

Parameters 1 and 2 may be calculated through well established mathematical correlations covering a wide range of possible flight condition. These two parameters depend mainly on flight speed and altitude. Their variations with time may therefore be calculated for any given flight plan specifying speed and altitude for any instant of the flight. In this manner the flight conditions expressed by two numerical data may be fed into the simulator system.

Parameter 3 is easily simulated if full size test specimens such as actual airplane components are used. If scale models are used conditions of geometric and thermal similarity must be observed.

The principle of simulating transient convective heat transfer, as achieved through the simulator-heater may be understood from the following considerations.

Generally, the rate of heat exchanged per unit time between solid surfaces and moving fluids when both are at different temperature levels is determined by ($a$) the temperature difference and ($b$) the convective heat transfer coefficient. This coefficient is an expression of the thermal conductance or, inversely, the thermal resistance to the flow of heat from the high temperature level to the low one. It depends mainly on the velocity and density of the fluid medium.

Fig. 1 shows schematically such a heat exchanging system. From the heat source 1, maintained at higher temperature levels by the controlled heater 5, heat flows through a thermal resistor 2 of thickness $d$ to the heat sink 3 which is at a lower temperature which may be measured by thermocouple 6. The system is shown inclosed by insulating side walls 4 to prevent side effects. Calculation of the rate of heat transfer is only possible if the temperature of both the source and the sink are known as well as the heat transfer coefficient. This may be easily accomplished if steady state conditions prevail so that the sink temperature will reach an equilibrium value. However, under transient conditions, when temperature and heat transfer coefficient vary with time, analytical prediction of the instantaneous or cumulative rate of heat transfer will be very difficult.

In free flight the same basic mechanism holds also for the heat exchange between the surface of a flying vehicle and the surrounding air. In the case of aerodynamic heating, heat is flowing from the air which is contained in the boundary layer enveloping the entire craft into the skin of the vehicle. The air, heated by friction along the surface of the craft, becomes the heat source 1. The aircraft surface, being at a lower temperature level due to the effects of high heat absorption, internal cooling, radiation effects, etc. may be considered as the heat sink 3. The thermal resistor 2 represents the molecular heat transfer mechanism immediately on the surface of the craft. The first two parameters mentioned above, air temperature or temperature of the heat source and the convective heat transfer coefficient as represented by the thermal resistor will vary with flight speed and altitude in a manner prescribed by the particular flight plan investigated and may be calculated, but the temperature of the heat sink or aircraft skin is not known and will adjust itself to a value determined by the external heating and the internal heat absorption characteristics. This temperature of the skin which is greatly affected by transient variations of altitude and speed (particularly in the range Mach 1 to 5) is one of the key parameters for the design of high speed aircraft. The measurement of this value as by the thermocouple 6 is the ultimate aim of the flight simulator method since analytic calculations are very difficult if complex structures and arbitrary variations of flight speed and altitude are involved.

The simulator meets this goal by duplicating free flight heat transfer parameters through laboratory techniques. Full size or scale down models of the surface of the vehicle under investigation will be the test specimen. In the case of investigation of aerodynamic heating effects it will serve as a heat sink. For this case the heat source will be a heated plate of proper size installed parallel to the test surface. During the tests this plate, which simulates the heated air, is to be heated timewise to the temperatures which would be assumed by the air under free flight conditions.

The heat transfer coefficient will be simulated by a variable heat resistor located between heat source and heat sink. This may be justified on the basis of a physical interpretation of the heat transfer coefficient. This coefficient, also called the "thermal conductance" is an expression for the effect of the rather complicated mechanism of heat exchange between fluids and solid walls. Such effect may be interpreted to be some kind of resistance to the flow of heat from or to a solid wall. Consequently, the same effect may be caused by a physical thermal resistor located between the two heat exchanging media. Physically, such a resistor could be a thin layer of a material chosen such that the ratio of thermal conductivity of the material to the thickness in the heat flow direction equals the numerical value of the convective heat transfer coefficient to be simulated. By such a system the complicated mechanism of convective heat transport is reduced to an equivalent but simpler mechanism of conductive heat transport causing the same overall heat exchange phenomena.

Thus the present simulator system replaces the convective heat transfer system of the free flight to be studied by an easily controllable conductive heat transfer system in a laboratory rig. In such a manner the two basic parameters of free flight, the heated air and the heat transfer coefficient, may be simulated within their range of anticipated variation by a controlled heater and a controlled thermal resistor. The unknown surface temperature and the corresponding heating effects may then be realistically measured if the test specimen is thermally similar to the object under investigation.

It should be mentioned that this basic system is independent of the direction of heat flow. It applies as well to the problems of cooling in free flight such as would be encountered in low speed flight at high altitudes.

Various simulator constructions are possible for the practical application of the ideas outlined above. The temperature control plate may be a device which is heated by conventional means such as an electrical resistance element, combustion gases, heated liquids, etc. or which is cooled by heat exchange with circulating cold liquids or gases. When required the heater plate may be equipped with a heat flow meter of any suitable conventional type.

Five different embodiments of heat simulator are shown in Figs. 2 to 6 in which corresponding reference characters are used for identical parts. Fig. 2 shows a simulator which employs a fluid as the thermal resistor 10. This fluid may be a gas such as hydrogen or helium, it may be a liquid such as a silicon oil, a liquid metal such as mercury or it may be a suitable paste of desired thermal conductivity and stability within the working temperature range. In general liquids are suitable up to approximately 500° F. and liquid metals or gases are preferred above this temperature. Control of the heat transfer coefficient may be obtained by varying the effective length $d$ of the fluid layer, i. e., by moving the heater plate 11 in the direction of heat flow, that is, by moving the plate parallel to the test surface 12. This is true since the conductive heat transfer coefficient is defined as the ratio of the thermal conductivity of the material to the thickness of the material in the direction of heat flow. This movement may be controlled by any suitable gearing arrangement indicated schematically at 13. Displaced resistor fluid may be received by a surge tank 14. The apparatus is surrounded by insulated side walls 15 to prevent side effects, and is provided with a diathermic top wall 9 to retain the thermal resistor in intimate heat exchange with test surface 12. Heater plate 11 has embedded therein an electrical resistance heater 16 and coils 17 through which may be passed either a suitable heating or a suitable cooling medium. A conventional heat flow meter 19 is mounted on the top surface of the plate 11 to facilitate calculations if the thermal conductivity of the fluid 10 is not precisely known. A thermocouple 18 may be used to accurately read and hence control the temperature of the plate 11 by any suitable conventional means.

Since the heat transfer coefficient equals the ratio of the thermal conductivity of the fluid 10 to the thickness of the layer or to the distance $d$, it is apparent that as $d$ is varied by moving the heater plate 11 a controlled variation of the equivalent heat transfer coefficient is possible. It is, of course, also apparent that the temperature of the plate 11 may be controlled in accordance with the readings of the thermocouple 18. The variations of both of these factors may be made to correspond exactly to the given variations of air temperature and convective heat transfer coefficient for any given flight plan. Hence the readings of thermocouple 20 on test surface 12 will provide a realistic measure of what surface temperatures will be throughout the given flight plan investigated.

Fig. 3 shows a modification of the simulator using a solid as a thermal resistor 21 and in which the heater plate 22 has a fixed position. The heater plate 22 is provided with coils 23 for the circulation of heating or cooling medium and with an electrical heating element 24. Projecting through the heater plate and continuing parallel to the insulated side walls 15 onto the test surface 12 is a tube 25 which has a traveling thermocouple 26 therein. The solid thermal resistor 21 may be any metal block having the desired heat conductivity or it may be a granular material such as granulated carbon. In this embodiment the traveling thermocouple 26 is positioned so that the distance $d$ between it and the test surface 12 when divided into the thermal conductivity of the solid 21 gives the desired heat transfer coefficient. The input to the heater plate is then adjusted so that the temperature at the position of the traveling thermocouple 26 will represent the desired air temperature. Thus again the two above mentioned parameters, air temperature and heat transfer coefficient are accurately simulated and the thermocouple 20 will give a realistic reading of corresponding surface temperature.

Fig. 4 shows another modification of the simulator in which again the plate 22 is in fixed position and includes coils 23 and resistance heater 24. Test surface 12 and insulated side walls 15 are as in previous embodiments. However, in order to obtain a more desirable control characteristic, the thermal resistor is built up in layers each having a different thermal conductivity. For a resistor the thermal conductivity of which is constant throughout its length, the effective heat transfer coefficient varies hyperbolically with the length. In order to obtain a more convenient control characteristic, the resistor may be built up of layers 30, 31, 32, 33, 34, each featuring a different conductivity or made out of material having a continuously variable conductivity. Such materials are mixtures of metals and non-metals with continuously varying concentration of one component or may, for example, be a mixture of carbon and ceramic granulae of continuously varying concentration. Thermocouples 35, 36, 37, 38, 39 are located at various planes throughout the material. Again the heat transfer coefficient is determined by selecting that thermocouple having the desired distance from it to the test surface. The air temperature to be simulated is then represented by the temperature at the chosen thermocouple and plate heating is varied to control it.

Figure 5:
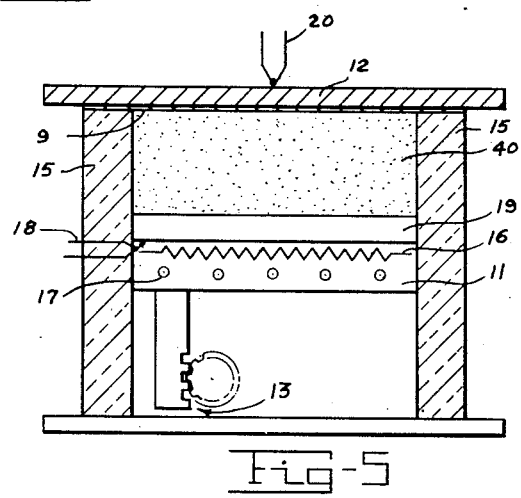

Fig. 5 shows a system employing a solid granular material 40 such as carbon or graphite as the thermal resistor. Heater plate 11 with heater 16 and coils 17 is arranged as in Fig. 2 to be movably positioned by a gear drive 13. Thermocouple 18 is used to read the heater plate temperature which represents air temperature. Heat flux meter 19 is arranged as in Fig. 2 in order to determine the effective thermal conductivity of the resistor bed. The thermal conductivity in this system is controlled by varying the pressure applied to the granular carbon by gear mechanism 13 which has a very limited range of travel. Granular materials such as carbon when compressed will change their thermal conductivity according to the pressure applied. Thus instead of a substantial variation in length of the thermal resistor, the conductivity may be varied as well by applying mechanical pressure to the granular bed. The heater again will represent the heated air, but it must be combined with a heat flux meter in order to determine the effective thermal conductivity of the resistor bed.

Figure 6:
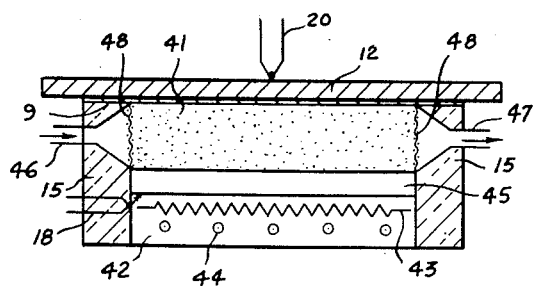

Fig. 6 shows a system using a thermal resistor 41 which consists of a mixture of components of different phases such as a solid and a liquid or a solid and a gas. A preferred system, for example, consists of carbon granulae and helium gas. Heater plate 42 is in fixed position and contains resistance heater 43 and coils 44. A heat flux meter 45 is used in conjunction with heater plate 42 and thermocouple 18 in order to measure the effective thermal conductivity of the thermal resistor 41. The resistor bed 41 is contained between the usual insulating walls 15 which have fluid inlet 46 and fluid outlet 47 extending through them. The granular material is held in place by screens 48. Again the temperature of the test surface 12 is read by thermocouple 20. This arrangement is advantageous whenever the thermal conductivity of a single material does not meet the requirements for covering a given range of conductivities to be simulated. By this method the thermal conductivity of a given material, such as carbon granulae, may be considerably increased without increasing its heat capacity correspondingly. The greatest increase of control range is achieved if the gaseous or liquid fluid filling the void spaces between the granular solid flows through the solid material perpendicularly to the heat flow. Variations of the speed and pressure of the fluid will have large effects on the thermal conductivity of the system. The fluid may normally be recirculated from outlet back to inlet, but if the temperatures involved are so high as to make it desirable to discharge a part of the fluid from the system provision must be made to measure the heat extracted from the system by the discharge fluid. In either event the air temperature is simulated by the measured temperature of the heater plate and variations of the heat transfer coefficient are achieved by variation of the kind, speed and pressure of fluid flowing through the granular bed. The effective heat transfer coefficient is determined by the heat flux meter.

Figure 7:
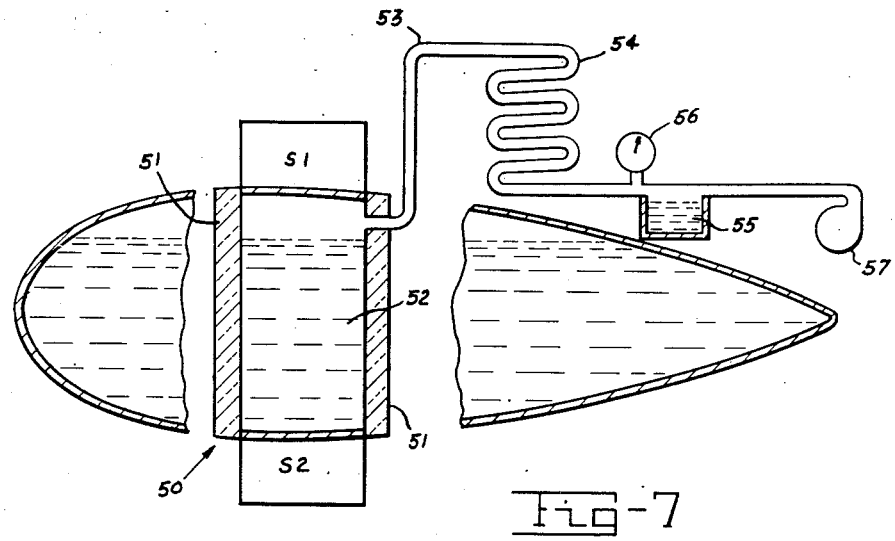
Fig. 7 is a cross-sectional view showing two of the simulators applied to a section of an integral wing tank to be studied.

Fig. 7 shows one application or use for any one of the simulators shown in Figs. 2 to 6. In Fig. 7 a pair of the simulators are represented by S1 and S2 and are used for laboratory simulation of transient flight conditions for the determination of fuel losses in integral wing tanks due to aerodynamic heating. As may be seen the two simulator-heaters S1 and S2 are attached to the top and bottom surfaces of a test tank 50 representing a full size cut out of the fuel tank under investigation. Materials, geometry, content, etc. of the cut out section will be exact replicas of those of the fuel tank under investigation. Thermal insulation 51 of the side walls of the cut out is used to minimize undesired side effects. The fuel tank section containing fuel 52 is connected by conduit 53 and condenser 54 to a trap 55 in which the fuel which has evaporated in the tank section 50 may be collected and measured. The system is maintained under reduced pressured by a vacuum pump 57 and a meter 56 indicates the pressure of the system, which is controlled in such a fashion as to simulate high altitude conditions.

It is apparent that the known variable parameters, air temperature and heat transfer coefficient, for any given flight schedule may be reproduced by the simulators S1 and S2 and hence the resultant fuel loss for the given tank section during this flight may be accurately determined in the laboratory.

Figure 8:
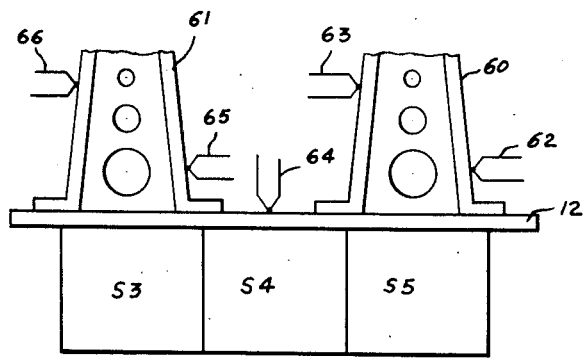
Fig. 8 is a cross-sectional view of a reinforced surface to be tested showing three of the simulators applied thereto.

Fig. 8 shows the application of simulator-heaters, S3, S4, and S5, to the determination of the temperature distribution in aircraft structural elements and components inside the heated skin due to transient heating or cooling effects. Structural beams 60 and 61 are shown supporting skin or test surface 12 against which the simulators are applied. Thermocouples such as 62, 63, 64, 65, and 66, may be used to determine the temperature distribution within the system. These tests may be combined with static or dynamic strength tests or they may prescribe the thermal conditions of the structure for the design of strength tests. Through such an arrangement transient in-flight heat transfer phenomena may be simulated by the heat exchange between the simulator heaters and the surface of the test specimen, controlled in such a manner that the simulator control parameters which represent corresponding values on the surface of flying vehicles vary with time in the same manner as the corresponding parameters under the given flight conditions.

The simulator system described above simulates only convective heat transfer phenomena. Actually, however, when higher temperatures are involved the heat input into a surface will also be controlled by the thermal radiation from the surface into the environment. Thus, a part of the frictional heat transferred to the surface by convection will be rejected by radiation from the surface before it enters the structure of the skin. This effect may greatly reduce the net heat load and must be taken into account at high temperatures when the input parameters of the simulator are determined. Unfortunately, the radiation effect depends primarily on the temperature of the test surface, a value which is not known and has to be determined by the simulation tests. Thus the correction may only be applied after this temperature has been determined. Then, repetition of the simulator tests with corrected input conditions will finally lead to the true temperature of the surface.

However, this correction may be directly determined during the simulator test and may be applied instantaneously to correct the input conditions by means of a combination of the thermal simulator test system with an electrical analogue computing system. As noted above, the net or effective rate of heat transfer to the test surface during a given flight test run depends on the temperature difference between the air and the surface or wall, and the heat transfer coefficient. If one of these parameters can be properly modified during the tests in order to account for radiation effects, the effective input conditions will be accurately simulated.

Of the two temperatures constituting the temperature difference only one, the air temperature, is known, therefore the correction cannot be applied to this parameter. But it is possible to modify the convective heat transfer coefficient, $h_c$ to account for radiation by expressing the radiation through a fictitious heat transfer coefficient $h_r$. Then the difference of these two coefficients will constitute the effective heat transfer coefficient $h_{eff}$ to be simulated by control of the thermal resistor. This calculation and correction procedure may be automatically accomplished by an electrical computation network such as is schematically indicated in Fig. 9.

The radiative heat transfer coefficient $h_r$ may be defined as the ratio of the radiative rate of heat transfer $Q_r$ to the temperature difference of the heat source and the heat sink $T_A - T_W$. The radiative heat $Q_r$ is, in turn, equal to $\epsilon \sigma T_W^4$ by the well known law of radiation. A signal representing $T_W$ is obtained from test surface 80 by a thermocouple and fed to computer component 70 which raises it to the fourth power and has an output $T_W^4$. This is fed as one input to computer component 71 which has as another input the constants $\epsilon \sigma$ generated by computer component 72. The output of 71 is then the product $\epsilon \sigma T_W^4$ which is equal to $Q_r$. Simultaneously another signal representing $T_A$ is derived from a thermocouple attached to heater plate 81. $T_A$ and $T_W$ are fed to computer component 73 which has an output equal to their difference $T_A - T_W$. This output is fed as one input to computer component 74 which has as its other input the output of component 71, that is $Q_r$. The transfer function of component 74 is made such that it will produce the quotient of its two inputs, that is, its output will be $Q_r/(T_A - T_W)$ which by definition is equal to $h_r$, the radiative heat transfer coefficient or the desired correction signal for the simulator input controls. The other simulator input control signals are derived from the given flight plan data of altitude and speed as a function of time. These raw data are first converted by well known mathematical relations to variations of air temperature and convective heat transfer coefficient $h_c$ as a function of time. A signal representing the variations of $h_c$ is then generated by conventional means and is fed as one input to computer component 75 which has as its other input $h_r$ which is the correction factor output of component 74. The output of 75 is the difference between its inputs $h_c - h_r$ which is equal to $h_{eff}$, the effective heat transfer coefficient. This signal is fed to control element 76 which controls the thermal resistor in such a manner as to produce the desired thermal simulation of the effective heat transfer coefficient. The details of this control element will vary according to which type of simulator unit is used. For example, if simulator unit 90 is of the type shown in Figs. 2 or 5 control element 76 may be the control of a motor which drives gear 13. Simultaneously a signal representing the variations of air temperature $T_A$ is derived from the converted flight data and fed to control element 77 which may be a thermostat controlling the temperature of heater element 91 of heater plate 92. It is understood that simulator 90 may be of any of the types shown in Figs. 2 to 6 and that the showing in Fig. 9 of simulator 90 is intended as merely a conventional representation of any one of these types all of which would include insulated walls 15 surrounding the simulator and the test specimen 93.

As may be seen from Fig. 9 such a system is capable of simulating not only the two parameters, air temperature and convective heat transfer coefficient, but also of applying a correction factor to automatically correct for errors due to radiation effects when the given flight plan data are such that the radiation effects are not negligible.

It is understood that the foregoing describes only the presently preferred embodiment of the invention and is not intended to limit the scope thereof. Many different but equivalent techniques could obviously be used to simulate the variable heat transfer coefficient. Obviously the controlled variation of any geometric or thermal property of a solid or fluid material could be used to achieve this effect.

Having thus fully described my invention, what I claim is:

1. A heat simulator unit for use in laboratory simulation of the transient aerodynamic heat exchange conditions for a given aircraft executing any given flight schedule comprising, a box having heat insulated side walls, a diathermic top wall adapted to be placed in heat exchange relation with a surface of the aircraft specimen to be tested, a temperature control plate placed substantially parallel to said diathermic top wall and forming the bottom wall of said box, means to vary the temperature of said plate, a thermal resistor within said box and placed between said plate and said diathermic top wall, and means to vary the effective conductive heat transfer coefficient of said thermal resistor, whereby a temperature determined by the means to vary the temperature of said plate may be made to simulate the air temperatures encountered in said given flight schedule and the variations of the effective conductive heat transfer coefficient of said thermal resistor may be made to simulate the variations of convective heat transfer coefficient encountered in said given flight schedule, so that the temperature at said test surface will provide an accurate measure of what said surface temperature would be in actual free flight during the given flight schedule.

2. Apparatus as in claim 1 wherein said thermal resistor is a fluid and said temperature control plate is movably mounted so as to vary the distance between said plate and said diathermic top wall thereby varying the effective heat transfer coefficient of said resistor, and a surge tank connected to said box to receive fluid displaced by the movement of said plate.

3. Apparatus as in claim 1 wherein said thermal resistor is a solid of constant conductive heat transfer coefficient and said temperature control plate is fixedly mounted, and a tube extending through said plate and said resistor and parallel to said side walls, said tube containing a temperature measuring element which is adjustable in position throughout the length of said tube, said position determing a variable reference plane so as to vary the effective conductive heat transfer coefficient of said resistor between said plane and said diathermic wall.

4. Apparatus as in claim 1 wherein said temperature control plate is fixedly mounted and said thermal resistor consists of a mixture of different granular solids the components of said mixture varying in concentration throughout the distance between said temperature control plate and said diathermic wall so that the effective conductive heat transfer coefficient of said resistor is variable between any given reference plane and said wall.

5. Apparatus as in claim 1 wherein said thermal resistor consists of a homogeneous granular solid material and said temperature control plate is movably mounted so as to apply varying pressure to said granular solid material thereby varying the effective conductive heat transfer coefficient of said thermal resistor.

6. Apparatus as in claim 1 wherein said temperature control plate is fixedly mounted and said side walls have fluid inlet and outlet ducts extending therethrough between the plane of said temperature control plate and said diathermic wall, and said thermal resistor consisting of a solid granular material through which a fluid from said ducts is passed thereby varying the effective conductive heat transfer coefficient of said resistor in accordance with the flow of said fluid.

7. Apparatus as in claim 6 wherein said solid granular material is carbon and said fluid is helium gas.

8. A heat simulator unit for use in laboratory simulation of the transient aerodynamic heat exchange conditions for a given aircraft executing any given flight schedule comprising, a box having heat insulated side walls, a diathermic top wall placed in heat exchange relation with a surface of the aircraft specimen to be tested, means to measure the temperature at said test surface, a temperature control plate placed substantially parallel to said diathermic top wall and forming the bottom wall of said box, means to vary the temperature of said plate and means to measure a temperature determined by said variation, a thermal resistor within said box and placed between said plate and said diathermic top wall, means to vary the effective conductive heat transfer coefficient of said theemal resistor, means to generate a first electrical signal proportional to the air temperatures which would be encountered in said given flight schedule, means connecting said first signal so as to control the means for varying the temperature of said plate, means to generate a second electrical signal proportional to the convective heat transfer coefficients which would be encountered in said given flight schedule, and means connecting said second signal so as to control the means for varying the effective conductive heat transfer coefficient of said thermal resistor.

9. Apparatus as in claim 8 and including an electrical analogue computer network which derives one input signal from the means to measure the temperature at said test surface and another input signal from the means to measure the temperature determined by said plate, said network being constructed and arranged to compute as its output signal a correction factor representing the heat which would be lost by radiation from said test surface, means for subtracting said output correction factor signal from said second signal representing the convective heat transfer coefficient before said latter signal is fed to the means connecting it to control the means for varying the effective conductive heat transfer coefficient of said thermal resistor, whereby an instantaneous correction for heat loss by radiation is applied to the simulation of said convective heat transfer coefficient.

10. Apparatus for simulating and measuring transient convective aerodynamic heat exchange between an aerodynamic heat source and heat sink comprising first means to simulate said aerodynamic heat source, second means to simulate said aerodynamic heat sink, a conductive thermal resistor interposed between said first and second means, means to vary the conductive heat transfer coefficient of said thermal resistor, and means to measure the temperature of said heat sink.

References Cited in the file of this patent
UNITED STATES PATENTS

| 2,204,836 | Waldo | June 18, 1940 |
| 2,272,245 | Kuck | Feb. 10, 1942 |
| 2,459,810 | Graves | Jan. 25, 1949 |
| 2,466,696 | Friswold | Apr. 12, 1949 |